(12) United States Patent  
Beabes et al.

(10) Patent No.: US 7,726,556 B2  
(45) Date of Patent: Jun. 1, 2010

(54) METHOD FOR RECONCILIATION OF METERED MACHINE BILLS

(75) Inventors: Minette Ann Beabes, Rochester, NY (US); Donald J. Gusmano, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 1119 days.

(21) Appl. No.: 11/187,047

(22) Filed: Jul. 22, 2005

(65) Prior Publication Data

US 2007/0017968 A1     Jan. 25, 2007

(51) Int. Cl.
*G06F 17/00* (2006.01)
(52) U.S. Cl. .................................. 235/375; 235/380
(58) Field of Classification Search .............. 235/375, 235/380, 382, 383
See application file for complete search history.

(56) References Cited

U.S. PATENT DOCUMENTS

| | | | | |
|---|---|---|---|---|
| 4,731,575 A | * | 3/1988 | Sloan | 324/113 |
| 4,970,655 A | * | 11/1990 | Winn et al. | 700/235 |
| 5,189,291 A | * | 2/1993 | Siemiatkowski | 235/462.45 |
| 5,616,902 A | * | 4/1997 | Cooley et al. | 235/380 |

\* cited by examiner

*Primary Examiner*—Daniel St.Cyr
(74) *Attorney, Agent, or Firm*—Maginot, Moore & Beck LLP (57) ABSTRACT

A system for reconciling a bill for the usage of a metered device includes an image capture device for generating an electronic image of a machine readable code associated with a hardcopy bill for the use of a metered device, a decoder for decoding at least one reconciliation instruction from the electronic image and a reconciliation controller for executing the at least one reconciliation instruction to enable a reconciliation of the hardcopy bill for the use of the metered device with stored metered device usage data.

13 Claims, 6 Drawing Sheets

METHOD FOR RECONCILIATION OF METERED MACHINE BILLS

TECHNICAL FIELD

The presently disclosed embodiments relate generally to printing machines, and more particularly, to multifunction printing machines.

BACKGROUND

Current electrostatographic devices such as copying machines or electronic printing machines are typically capable of counting pages. For customer records or for billing purposes, these devices include accounting mechanisms for computing the number of pages that are printed. In addition to the copy count, these devices may further acquire other information for billing purposes such as measurements of the actual use of a wide range of system services, including binding, scanning, stapling, stitching, shrink wrapping, etc. Further, the paper and toner consumption can be monitored. This information can then be used when generating a bill for the use of the device.

A conventional billing process of such an electrostatographic device begins by the customer reading the meter count for the service or services being billed. The customer then sends a hard copy document to the billing service that shows the current meter reading for the services to be billed. Alternatively, the customer may transmit the data such as by using a telephone or email. The billing service generates a hardcopy bill based upon the reported meter count. The generated hardcopy bill is then sent back to the customer and the customer can then authorize payment of the hardcopy. Once the customer authorizes payment of the bill, payment is effected, for instance by sending a check or an authorization to debit from his account, to the billing service.

Another known billing process differs from the process discussed above in that the customer commands the electrostatographic device to transmit service usage information to the billing service electronically. Accordingly, the electrostatographic device accesses a meter module and transmits data indicative of the usage of the electrostatographic services to the billing service. The billing service then generates a bill based on the received information and either sends the bill to the customer electronically or by hard copy.

In both of the above processes, however, the customer typically performs a reconciliation of the bill from the billing service with the meter reading from the electrostatographic device. This is accomplished by first determining what meter reading was sent to the billing service. To this end, when the customer transmits the meter reading to, or causes the meter readings to be transmitted to, the billing service, the customer typically writes the meter readings into a notebook and then transfers the meter readings to a spreadsheet. Accordingly, when the ensuing bill arrives, the customer accesses the notebook or spreadsheet and obtains the meter reading that was sent to the billing service. The meter reading that was sent may then be compared with the meter reading shown on the bill (the billed meter reading). The customer then determines what service credits are shown on the bill and applies these credits to the meter reading to determine if the bill correctly reflects the amount due to the billing service.

Obviously, such manual bill reconciliation may not be overly burdensome when a single electrostatic device of limited functionality is the sole device to be reconciled. The process quickly becomes complex and burdensome, however, when multiple services are possible on hundreds or even thousands of metered devices. The complexity of the problem is further exacerbated in situations where multiple parties are to be billed for each of the devices.

SUMMARY

According to aspects illustrated herein, a system for reconciling a bill for the usage of a metered device includes an image capture device for generating an electronic image of a machine readable code associated with a hardcopy bill for the use of a metered device, a decoder for decoding at least one reconciliation instruction from the electronic image and a reconciliation controller for executing the at least one reconciliation instruction to enable a reconciliation of the hardcopy bill for the use of the metered device with stored metered device usage data.

In a further embodiment, a method for reconciling a bill includes generating an electronic image of a machine readable code associated with a hardcopy bill for the usage of a metered device, decoding at least one reconciliation instruction from the electronic image, enabling a reconciliation module based upon the decoded at least one reconciliation instruction and reconciling data from the hardcopy bill with usage data of the metered device using the reconciliation module.

In another embodiment, a multifunction electrostatographic device includes a scanner for scanning documents, a decoder for decoding at least one reconciliation instruction from a glyph on a scanned document, a reconciliation controller for executing the at least one reconciliation instruction to enable a reconciliation of data from a hardcopy bill with stored data and a printer for printing copies of scanned documents.

The above described features and advantages, as well as others, will become more readily apparent to those of ordinary skill in the art by reference to the following detailed description and accompanying drawings.

DETAILED DESCRIPTION

Figure 1:
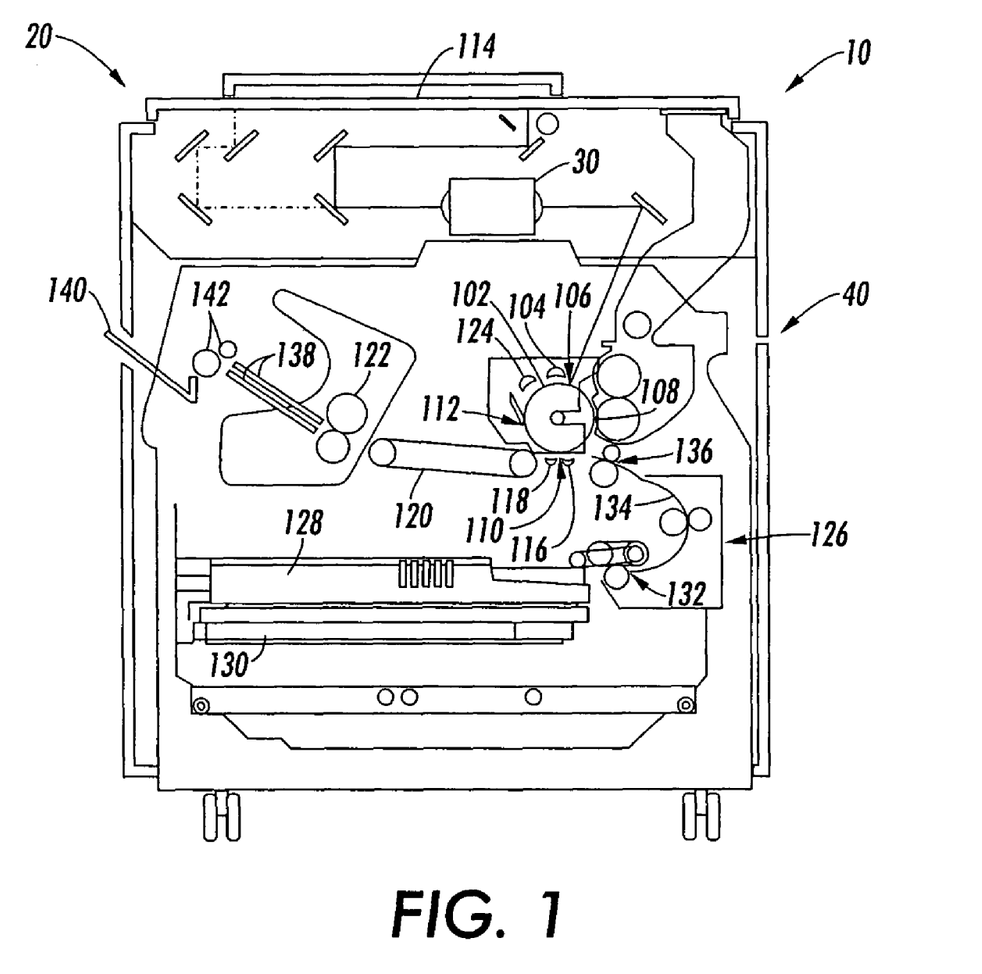
FIG. 1 shows a partial side elevational view of an exemplary networked electrophotographic machine incorporating a digital processing station.

Referring first to FIG. 1 there is shown a partial cutaway side elevational view of an exemplary multifunction electrostatographic machine 10. The machine 10 includes an image capture system 20, a digital processing station 30 and a printing system 40. The printing system 40 includes a photoreceptor drum 102 mounted for rotation (in the clockwise direction as seen in FIG. 1) to carry a photoconductive imaging surface of the drum 102 sequentially through a series of processing stations. Namely, a charging station 104, an imaging station 106, a development station 108, a transfer station 110, and a cleaning station 112.

The general operation of the printing system 40 begins by depositing a uniform electrostatic charge on the photoreceptor drum 102 at the charging station 104 such as by using a corotron. An image of a document D (see FIG. 2) to be reproduced that is positioned on a platen 114 is obtained by the image capture system 20. In this embodiment, the image capture device within the image capture system 20 is a scanning device that produces a flowing light image that is directed to a digital processing station 30. The digital processing station 30 (further described below) digitizes the flowing light image and/or passes the light image to the drum 102 at the imaging station 106 in the event that a physical copy of the document is to be made. The flowing light image selectively discharges the electrostatic charge on the photoreceptor drum 102 in the image of the document, whereby an electrostatic latent image of the document is laid down on the drum 102.

At the development station 108, the electrostatic latent image is developed into visible form by depositing toner particles on the charged areas of the photoreceptor drum 102. Cut sheets of a substrate are moved into the transfer station 110 in synchronous relation with the latent image on the drum 102 and the developed image is transferred to the substrate at the transfer station 110. A transfer corotron 116 provides an electric field to assist in the transfer of the toner particles to the substrate. The substrate is then stripped from the drum 102, the detachment being assisted by the electric field provided by an alternating current de-tack corotron 118. The substrate carrying the transferred toner image is then carried by a transport belt system 120 to a fusing station 122.

After transfer of the toner image from the drum 102, some toner particles usually remain on the drum 102. The remaining toner particles are removed at the cleaning station 112. After cleaning, any electrostatic charges remaining on the drum are removed by an alternating current erase corotron 124. The photoreceptor drum 102 is then ready to be charged again by the charging station 104, as the first step in the next copy cycle.

The transport of the substrate to the transfer station 110 in the above process is accomplished by a substrate supply system 126. In this embodiment, the substrate is selected from one of two types of substrate stored in two substrate trays, an upper, main tray 128 and a lower, auxiliary tray 130. The top sheet of substrate in the selected tray is brought, as required, into feeding engagement with a common, fixed position, sheet separator/feeder 132. The sheet separator/feeder 132 feeds a substrate around a curved guide 134 for registration at a registration point 136. Once registered, the substrate is fed into contact with the drum 102 in synchronous relation to the toner image so as to receive the toner image on the drum 102 at the transfer station 110.

The substrate carrying the transferred toner image is transported, by the transport belt system 120, to the fusing station 122, which is a heated roll fuser. The heat and pressure in the nip region between the two rolls of the fuser cause the toner particles to melt and some of the toner is forced into the fibers or pores of the substrate. The substrate with the fused image which is a copy C of the document D is then fed by the rolls in the fusing station 122 along output guides 138 into a catch tray 140 via the output roll pair 142.

Figure 2:
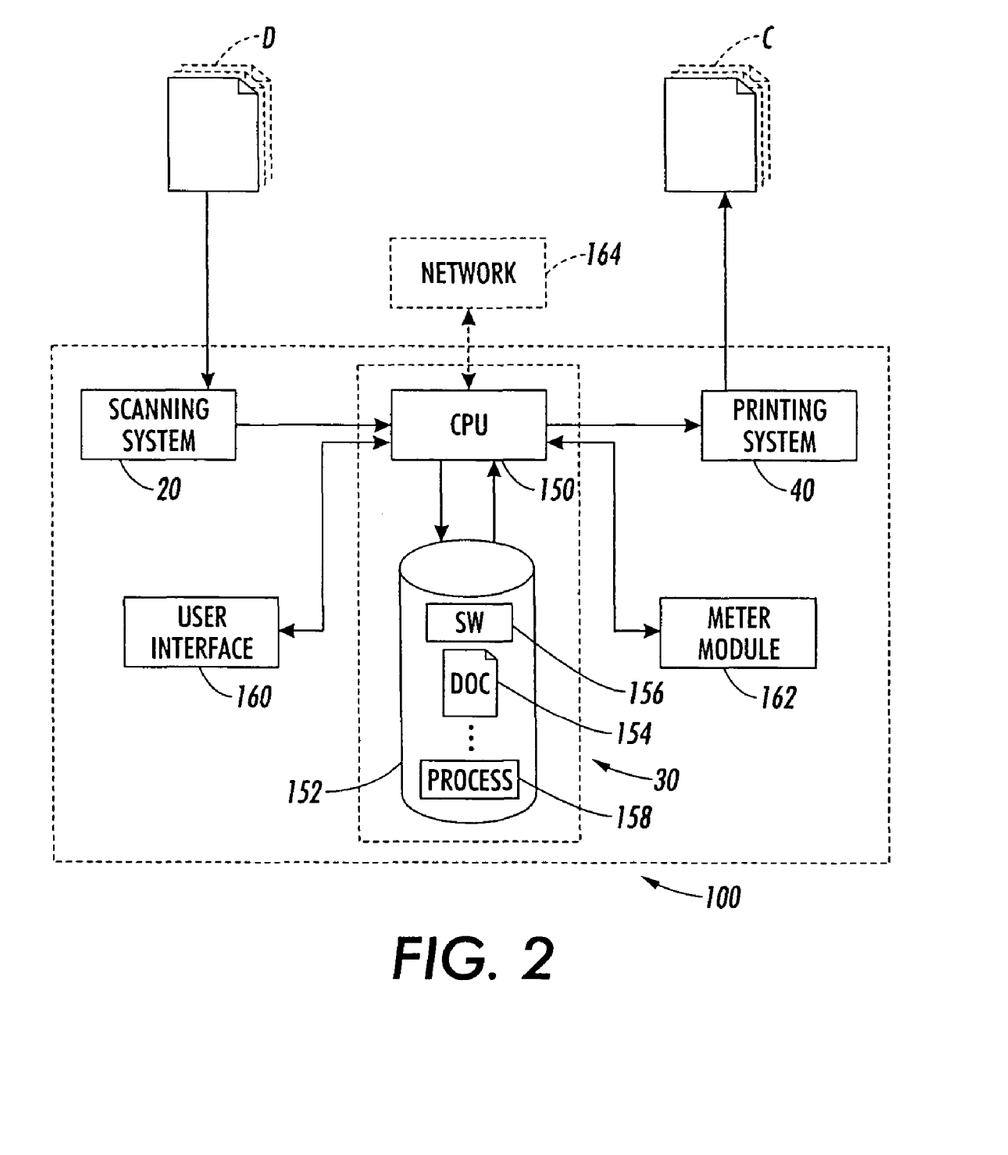
FIG. 2 shows a schematic representation of a digital processing station within the electrophotographic machine of FIG. 1.

Operation of the machine 100 is controlled by the digital processing system 30 shown in FIG. 2. The digital processing system 30 includes a CPU 150 and a memory 152. The memory 152 is generic and may comprise RAM, ROM, CD-ROM, or other media of storage such as hard disk, magnetic tape, or the like. Other devices for accepting, capturing and storing data are well known and the above list should not be construed as exhaustive.

The memory 152 may contain stored document files 154, system software 156, and bill handling process 158 (discussed below). The system software 156 which is run by the CPU 150 may reside in ROM, RAM, or other units of storage.

It will also be appreciated that the memory 152 may be a shared or distributed resource among many processors (not shown in FIG. 2) in a networked configuration.

The digital processing system 30 is connected to the image capture system 20, the printing system 40, a user interface 160, a meter module 162 and a network 164. The image capture device in this embodiment is a scanning device; however, other image capture devices may be used including, but not limited to, charge coupling devices. The user interface 160 is generically labeled and encompasses a wide variety of such devices. These interface devices include touch screens, keyboards, and graphic user interfaces.

The meter module 162 is in bidirectional communication with the CPU 150. The CPU 150 increments the meter module 162 for each use of a service of the machine 100. By way of example, the meter module 162 is incremented based upon the transport of a sheet to the registration station 136 to reflect that a copy has been made. Additional information that may be captured by the meter module 162 includes data as to whether or not the copy was a color copy, any special account under which the copy was made, and an indicator of the size of the substrate that was used. The size of the substrate used for a particular copy may be determined by sensing the tray from which the substrate is provided to the sheet separator/feeder 132 or by a sensor in the machine 100.

Figure 3:
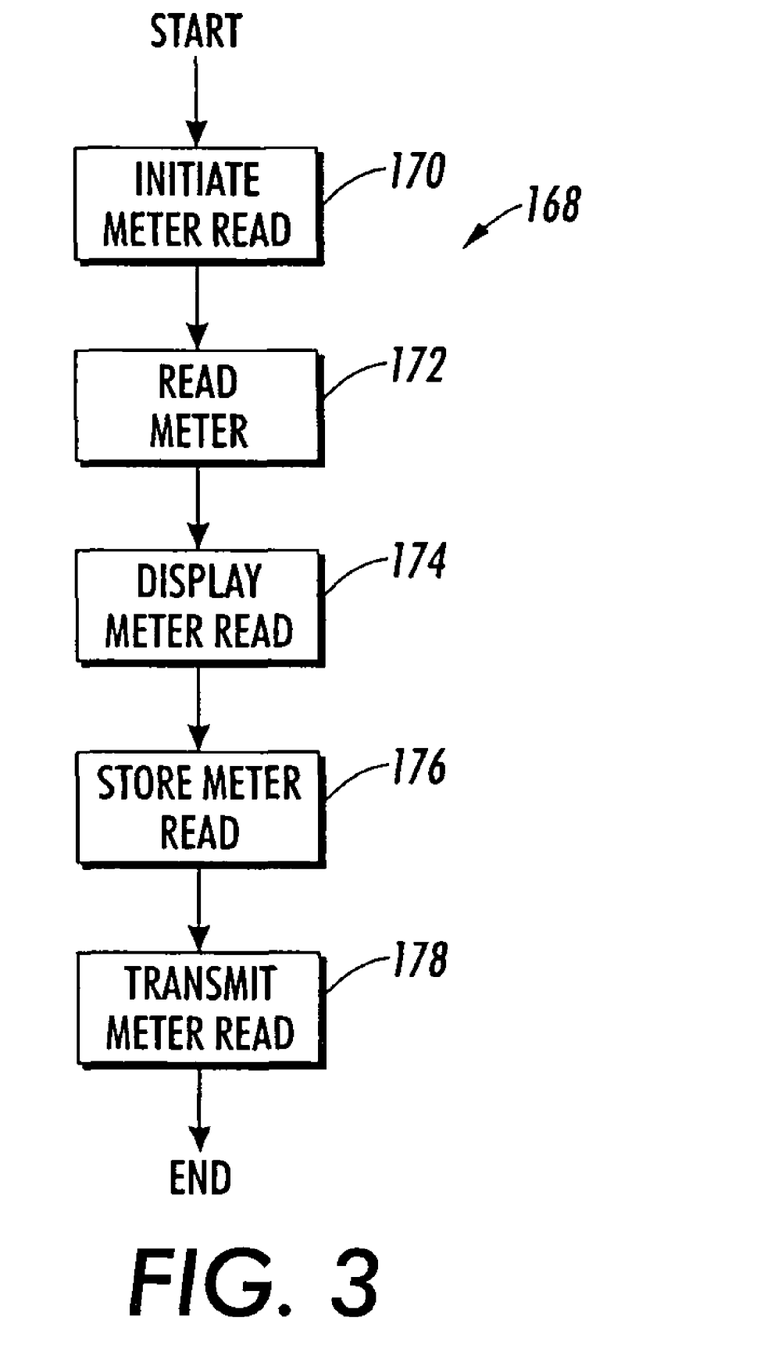
FIG. 3 shows a process for obtaining a meter reading for the use of services provided by the electrophotographic machine of FIG. 1.

Operation of the machine 100 for obtaining a meter reading is described with reference to the process 168 shown in FIG. 3. At the step 170, a customer initiates the meter reading by inputting a command to the CPU 150 through the user interface 160. In response, the CPU 150, which in this embodiment functions as a reconciliation controller, interrogates the meter module 162 at the step 172 and obtains the meter readings for the services being read. In this embodiment, the time and date of the meter reading is determined as well as indicators of the total number of impressions made, the total number of color impressions and the total number of large color impressions made. The data is displayed to the customer at the step 174 for verification. Once the customer verifies that the meter readings are to be sent to a billing service, the meter readings are stored into the memory 152 at the step 176 and transmitted to the billing service at the step 178. The meter reading process 168 then ends.

Those of ordinary skill in the art will appreciate in alternative embodiments, the meter reading may be initiated remotely through the network 164 and the meter reading may be sent to a proxy before being sent to a billing service. In such embodiments, reconciliation modules within the proxy may be configured to perform reconciliations based upon the receipt of data from the network 164. Moreover, the meter reading may be stored in a memory other than the memory 152, such as a memory at a proxy location.

Furthermore, additional steps may be included in a bill reading process. By way of example, when displaying the present meter readings, the method may further display a previously obtained meter reading. This is useful when the meters are simple counters. In such cases, the meter reading may merely be a number. Therefore, to understand what the usage has been since the last meter reading was done, the previous meter reading must be subtracted from the current meter reading. In a further embodiment, the CPU 150 obtains the previous meter reading and identifies to the customer any meter readings that have increased by more than a predetermined amount so that the customer may verify that the reading is correct or take corrective actions, such as calling a service technician, prior to sending the meter reading to the billing service.

Once the meter reading is transmitted to a billing service, a hardcopy bill is prepared using the data from the meter reading. In one embodiment, the hardcopy bill is in the form of a machine readable template. Machine readable templates have been in common use for some time. Such templates provide a mechanism for enabling actions to be taken based on marks on a paper without requiring human intervention such as reading or interpreting the templates. The marks on such templates are extracted under the control of a device commonly referred to as a template interpreter. The templates are typically digitized by a scanner or the like, and the template interpreter then digitally locates and characterizes the marks on the templates, and may output control signals as a function of the presence, location, nature, etc., of the marks to peripheral devices.

Information carried by templates can conveniently be divided into three categories: data to be manipulated, data providing machine instructions, and other information. Data to be manipulated is taken to mean information carried by the form to be read or extracted from the form such as the billed meter reading. This may be done, for example, by use of optical character recognition software. Machine instruction refers to information carried by a template which is interpreted by the template interpreter and which causes action either by the template interpreter or by a remote device. Examples of machine instructions include information located on a form which, when read, cause data to be copied to or from memory locations of a computer, cause a mathematical or logical procedure to be applied to particular data, etc. Other information, as used above, refers generally to information ignored by the template interpreter, such as the arbitrary text and graphics, prompts or instructions on the form to aid the user in filling in fields, information for the user's interest, ornamental treatment, etc.

Figure 4:
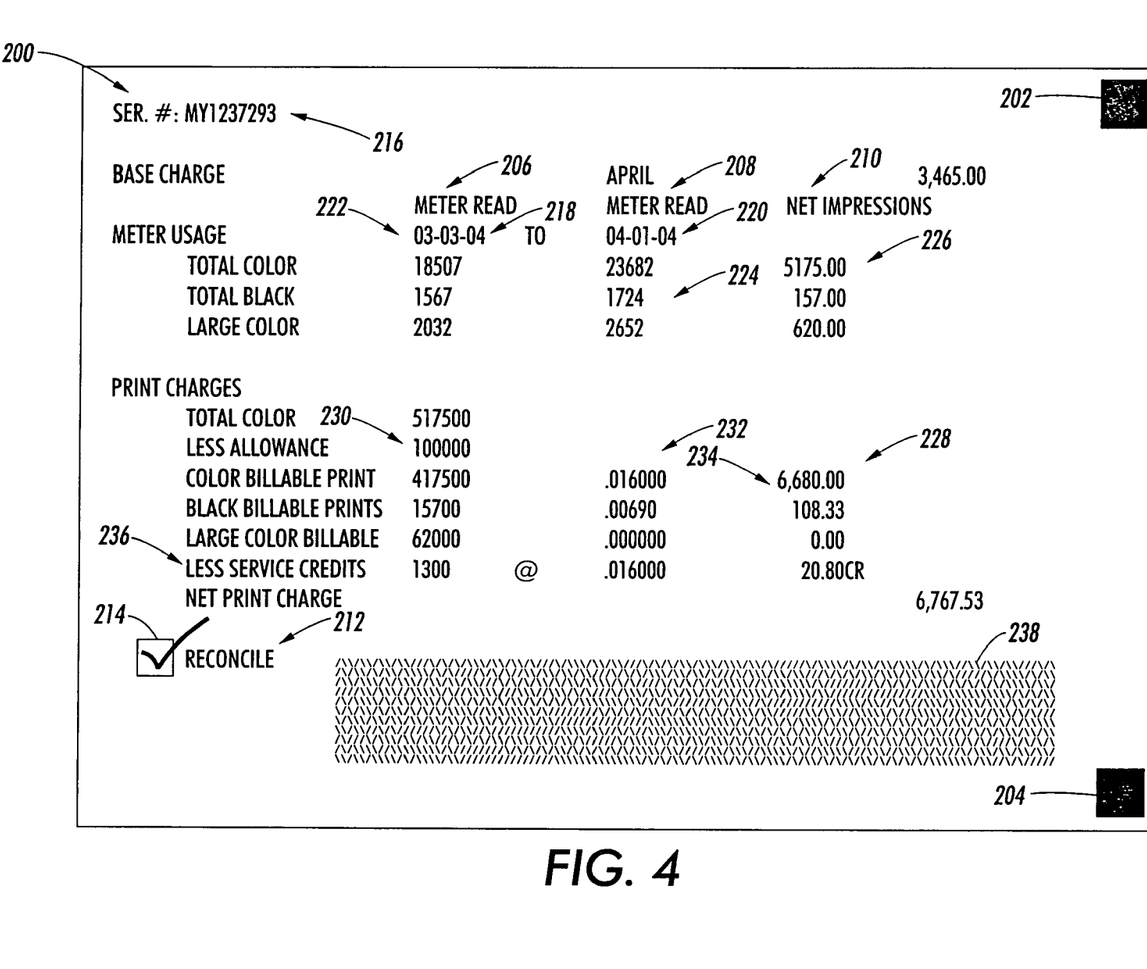
FIG. 4 shows a hardcopy bill incorporating a data glyph that may be used to digitize a hardcopy bill in performing an automatic reconciliation of the hardcopy bill.

In one embodiment, a hardcopy bill 200 is in the form of a machine readable template as shown in FIG. 4. The hardcopy bill 200 includes markings 202 and 204 located at specific locations on the hardcopy bill 200 so that the digital processing station 30 may determine where to look for the data to be read. Thus, the location of any field may be described in terms of horizontal and vertical displacements from the markings 202 and/or 204.

The hardcopy bill 200 further includes arbitrary text such as field titles 206, 208 and 210 and instructions 212. The check box 214 identifies an instruction field that in the embodiment of FIG. 4 has been marked with a check by the customer. Various data fields are also provided on the hardcopy bill 200. These data fields include customer identification field 216 and billing cycle fields 218 and 220. Data fields are also provided for the meter reading data at the start of the billing cycle (column 222) as well as the billed meter reading data for the close of the billing cycle (column 224) for various services. The difference between the column 222 and the column 224 is shown in the net impressions column 226.

The hardcopy bill 200 further includes a charges field 228 which includes a units column 230 identifying the total units for various tracked services, a cost column 232 identifying the per unit cost of the associated service, and a billing amount column 234 showing the amount that is billed for each tracked service. The charges field 228 also includes a line item 236 for service credits. Service credits are credits against the number of impressions that a service technician has given the customer. Such credits may be given, by way of example, if a machine malfunctions and produces a number of unacceptable prints.

A region 238 of encoded information which represents a structural description of the hardcopy bill 200, as well as other selected information, is also provided. The encoded information contained in the region 238 in this embodiment includes the complete description of the location of the fields on the hardcopy bill 200. Thus, if the location of any of the fields changes from one bill to the next, the data in the region 238 may be updated to accurately describe the new position of the fields. Of course, the region 238 may be arbitrarily located. Specifically, the region 238 need not be physically or logically placed on the hardcopy bill 200 with reference to the fields. Rather, in one embodiment, the digital processing station 30 automatically searches the digital image of the hardcopy bill 200 for the region 238. Once located, the information contained in the region 238 may be decoded by appropriate decoding means to provide the position information needed to read and process the remainder of the form. Alternatively, the region 238 may identify a template type which the digital processing station 30 associates with a layout of data fields identified in a look-up table.

The method of coding the information contained in region 238 may be by any convenient machine readable coding scheme. One example is the so called "bar codes" well known in the art. Another well suited scheme is described in U.S. Pat. No. 5,486,686 assigned to Xerox Corporation, which is herein incorporated by reference. In the embodiment of FIG. 4, the region 338 is a data glyph. Regardless of the method of encoding used, the encoded information may include a description of the physical location of one or more fields on the hardcopy bill 200, relative to the markings 202 and 204, and a description of the type of that one or more fields (i.e., bubble, alpha-numeric, image, etc.).

Examples of the further types of information which may be carried by the region 238 are instructions to a processor for specific processing of selected data, which may include data other than that gleaned from the hardcopy bill 200, dialing instructions to a facsimile machine acting as an interface between the document scanner and the form interpreter, network addresses for the routing of selected data, the data which is to be processed, etc. Thus, a template may be provided that is self-routing. Furthermore, programming of a processing apparatus may also be accomplished by the encoded information, thus alleviating the need to preprogram that portion of a data processing system.

Figure 5:
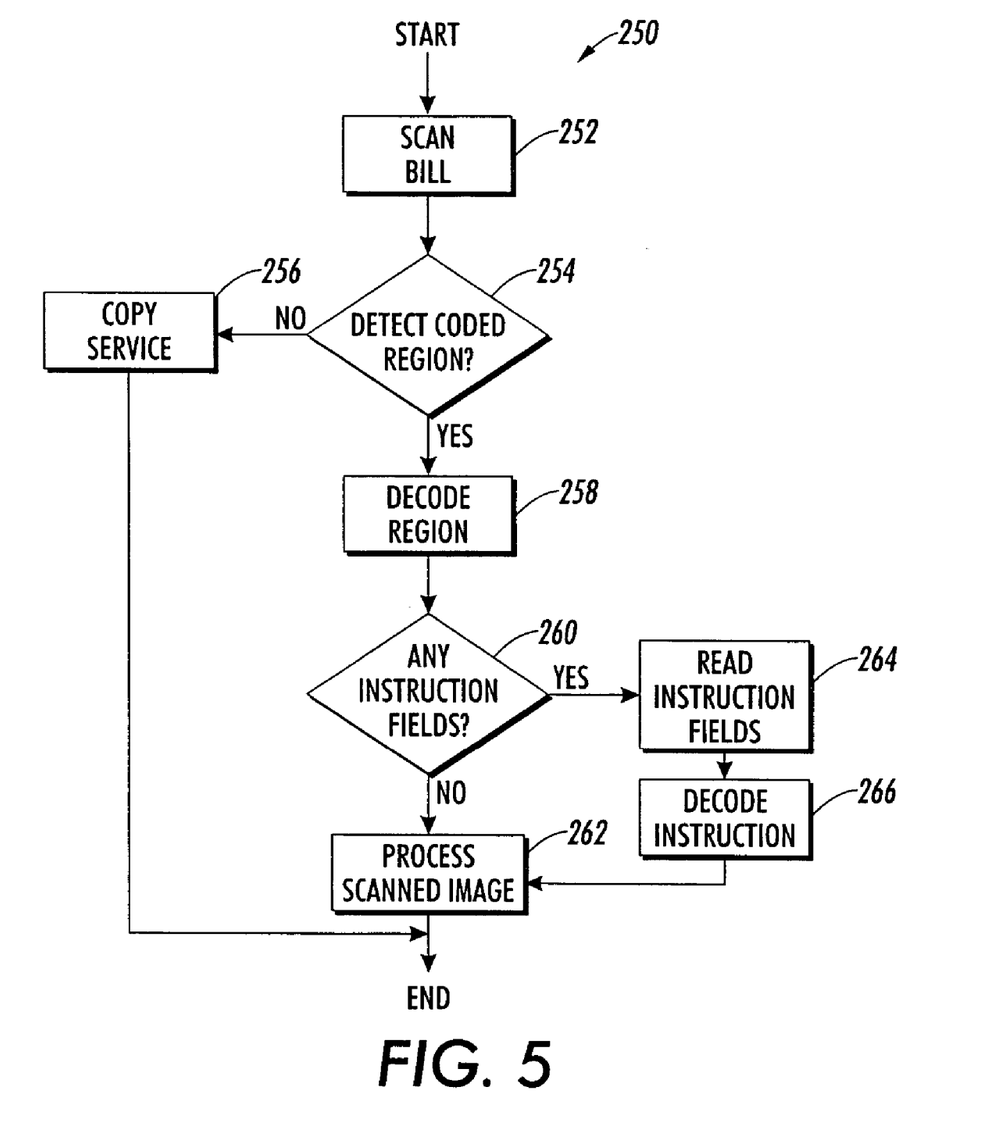
FIG. 5 shows a method of decoding a data glyph on a hardcopy bill and performing instructions encoded in the data glyph.

In accordance with one embodiment, the hardcopy bill 200 is digitized by the machine 10 in accordance with the process 250 shown in FIG. 5. The process 250 commences at step 252 by scanning the hardcopy bill 200. In this embodiment, the scanned image is processed by the CPU 150 using the software 156. When the scanned image is processed, the CPU 150, which in this embodiment functions as a decoder, is programmed to automatically search for an encoded region at the step 254. Alternatively, the user interface 160 may be used to selectively command the CPU 150 to search for an encoded region on a scanned image. In the event that an encoded region is not detected, the scanned image is used to make copies as programmed by the customer at the step 256 and the process 250 ends. In the present example, however, the hardcopy bill 200 includes an encoded region 238. Consequently, the region 238 is detected at the step 254 and at the step 258, the CPU 150, decodes the region 238.

At the step 260, the CPU 150 analyzes the decoded information from the region 238 to determine if the scanned image includes any additional instruction fields. If there are no further instructions, then the process 150 continues to the step 262 and the scanned image is processed in accordance with the data from the encoded region 238.

In this example, the check box 214 is identified as an instruction field. Accordingly, the process proceeds to the step 264 and the check box 214, and any other identified instruction fields, is read. At the step 266, the information from the instruction fields is decoded. In this example, the check box 214 has been marked by the customer. Accordingly, the process proceeds to the step 262 and the scanned image is processed in accordance with the data from the region 238 as well as the data from the decoded from the instruction fields. The process 250 then ends.

The above described system is extremely flexible. By way of example, a number of instructions may be encoded into the region 238. Alternatively, the customer may be given the option to control whether various instructions are followed by the CPU 150 through the use of instruction fields. Specifically, in the embodiment of FIG. 4, the customer is given control over whether or not the scanned bill is reconciled. In an alternative embodiment, the instruction to perform reconciliation is encoded within the region 238.

The flexibility of the above described system extends to how the scanned image is routed. The digitized image may be routed to any of a number of different locations such as to a proxy through the network 164. Additionally, the routing may be based upon instructions encoded within the region 238, or by a subroutine that is called in response to instructions encoded within the region 238 or based upon the markings in instruction fields.

Figure 6:
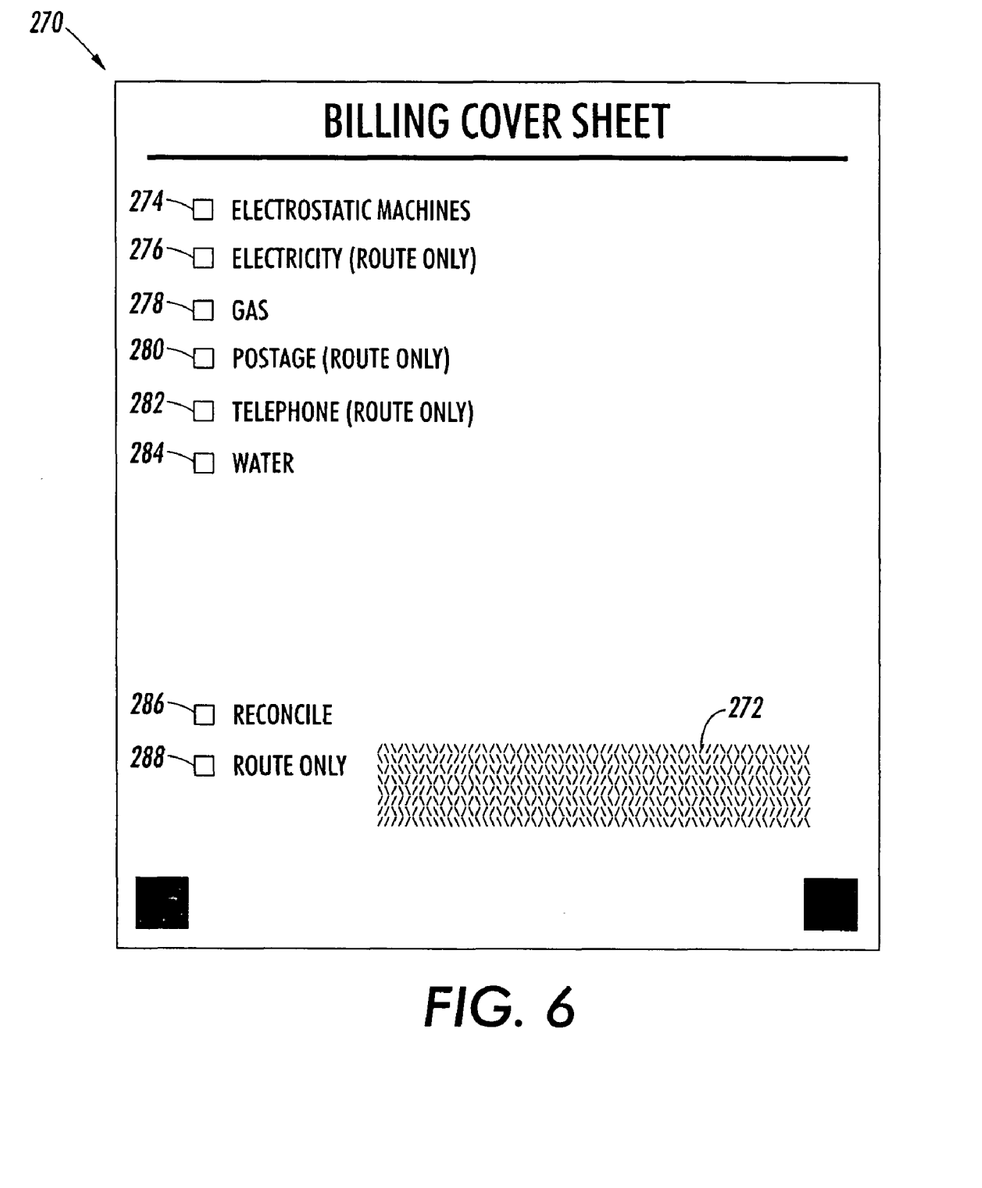
FIG. 6 shows a cover sheet with a data glyph that may be used to provide instructions for automatically reconciling a hardcopy bill with which the cover sheet is associated.

Moreover, the data glyph or other machine readable code need not located on the hardcopy bill. In fact, the data glyph and other machine readable codes need not be generated at the billing service. By way of example, FIG. 6 shows billing cover sheet 270 that may be used with hardcopy bills that do not include a region 238 or if an included coded region on a bill is not to be used. The cover sheet 270 includes a region 272 and instruction fields 274, 276, 278, 280, 282, 284, 286 and 288. The region 272 and the instruction fields 274, 276, 278, 280, 282, 284, 286 and 288 may be decoded in the same manner described above. The instructions, however, are different than the instructions discussed above with reference to the hardcopy bill 200.

Specifically, the billing cover sheet 270 identifies the sheets that follow the cover sheet as a particular type of bill. Thus, if a customer is scanning a gas bill, the instruction field 278 would be marked. Accordingly, when the CPU 150 detects and decodes the region 272, and then reads the instruction fields 274, 276, 278, 280, 282, 284, 286 and 288, the CPU 150 in this embodiment accesses a gas bill processing module and processes the scanned images following the billing cover sheet 270 as a gas bill.

The instruction fields 286 and 288 in this embodiment are only acted upon in the event that one of the instruction fields 274, 276 or 284 is marked by the customer. This is because the system has not been programmed to perform automatic reconciliation of electricity bills, postage bills or telephone bills. Accordingly, if any of the instruction fields associated with these bills is marked, the CPU 150 will only route the scanned image in accordance with instructions provided in either a module associated with the instruction filed or instructions within the encoded region 272.

In the event the customer has marked any of the instruction fields 274, 276 or 284, however, the CPU 150 will route the scanned image if the instruction field 188 is marked or reconcile the bill if the instruction field 286 is marked. If desired, a default action may be programmed into the CPU 150 or encoded in the region 272.

In any event, once the scanned image has been digitized, reconciliation of the bill may be accomplished in a number of ways. In one embodiment, the CPU 150 compares the billed meter reading directly to the transmitted meter reading. Alternatively, the CPU 150 may be programmed to read various credits on the hardcopy bill such as the service credits, and to adjust the transmitted meter readings based upon the service credits. Then, the adjusted transmitted meter reading may be compared to a billed meter reading that is based upon the transmitted meter reading and the credits.

Alternatively, it may be desired to make available to the CPU 150 a price list for the various services that are being billed. In such an embodiment, the CPU 150 may be programmed to obtain a reading of any credits identified on the hardcopy bill, and to generate a comparison bill based upon the transmitted meter reading, the current price list and any credits identified in the hard copy bill. Then, the CPU 150 may perform a reconciliation of the comparison bill and the hard copy bill. Any discrepancies may be flagged by the CPU 150 so as to draw the customer's attention to the discrepancy. Moreover, the CPU 150 may be programmed to generate a reconciliation report showing various comparison data and results.

Those of ordinary skill in the art will appreciate that the data glyph may further include the same data that is presented in printed form in the data fields, thus eliminating the need for optical character recognition software. Moreover, the amount of data may be range from a simple code used to activate a particular subprogram to all of the processing data needed to process the data on the hardcopy bill.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for reconciling a bill for the usage of a metered device comprising:
an image capture device for generating an electronic image of a machine readable code associated with a hardcopy bill;
a decoder for decoding at least one reconciliation instruction from the electronic image of the machine readable code;
at least one memory in which command instructions and metered device usage data are stored; and
a reconciliation controller for executing the at least one decoded reconciliation instruction and the command instructions to obtain metered device usage data from the hardcopy bill.

2. The system of claim 1, wherein the image capture device, the decoder, the reconciliation controller, and the at least one memory in which the metered device usage data are stored are housed within a multifunction device (MFD).

3. The system of claim 2, wherein the MFD is connected to a communication network, the system further comprising:
a reconciliation module located at a proxy coupled to the network, the reconciliation module being configured to receive over the network the metered device usage data obtained from the hardcopy bill.

4. The system of claim 3, wherein the reconciliation controller is operable to obtain metered device usage data from the machine readable code associated with the hardcopy bill.

5. The system of claim 2 wherein the image capture device generates an electronic image of the hardcopy bill, and the system further comprises:
a reconciliation module located at a proxy, which is coupled to the MFD by a communication network, the reconciliation module being configured to receive the electronic image of the hardcopy bill from the MFD over the communication network and to obtain metered device usage data from the received electronic image.

6. The system of claim 2 further comprising:
a reconciliation module configured to compare the metered device usage data obtained from the hardcopy bill with the metered usage data stored in the at least one memory in response to the reconciliation controller detecting an encoded region in the machine readable code associated with the hardcopy bill.

7. The system of claim 6, wherein the reconciliation module is further configured to receive stored service credit data associated with a metered device and compare the received service credit data to service credit data obtained from the hardcopy bill.

8. The system of claim 1, further comprising a billing module operable to:
- receive a meter reading indicative of a usage of a metered device;
- generate a hardcopy bill based upon the meter reading; and
- associate a machine readable code with the hardcopy bill.

9. The system of claim 8, wherein the billing module is operable to generate the hardcopy bill in the form of a template comprising:
- an instruction field;
- a data field; and
- an arbitrary text field.

10. A multifunction electrostatographic device comprising:
- a scanner for scanning documents;
- a decoder for decoding at least one reconciliation instruction from a glyph on one of the scanned documents;
- a memory in which command instructions are stored;
- a reconciliation controller for executing the at least one decoded reconciliation instruction and the command instructions to obtain metered device usage data from one of the scanned documents, the reconciliation controller coupled to a device with stored metered device usage data; and
- a printer for printing copies of scanned documents.

11. The multifunction electrostatographic device of claim 10, wherein the metered device usage data obtained from one of the scanned documents comprises billing data corresponding to usage of the multifunction electrostatographic device, the multifunction electrostatographic device further comprising:
- a meter module for generating metered device usage data corresponding to the usage of the multifunction electrostatographic device; and
- a communication network interface for sending the metered device usage data generated by the meter module to a billing service, wherein
- the metered device usage data sent to the billing service is stored in the memory.

12. The multifunction device of claim 11, further comprising:
- a reconciliation module configured to compare the metered device usage data obtained from one of the scanned documents with the metered device usage data generated by the meter module in response to the reconciliation controller detecting an encoded region on the scanned document from which the metered device usage data was obtained.

13. The multifunction device of claim 10, further comprising:
- a communication network interface for sending the metered device usage data obtained from one of the scanned documents to a reconciliation module located at a proxy.

* * * * *